United States Patent
Park et al.

(10) Patent No.: US 9,544,161 B2
(45) Date of Patent: Jan. 10, 2017

(54) METHOD AND APPARATUS FOR SCANNING IN WIRELESS LAN

(71) Applicant: LG ELECTRONICS INC., Seoul (KR)

(72) Inventors: Giwon Park, Seoul (KR); Kiseon Ryu, Seoul (KR); Jinsam Kwak, Seoul (KR)

(73) Assignee: LG ELECTRONICS, Seoul (KR)

( * ) Notice: Subject to any disclaimer, the term of this patent is extended or adjusted under 35 U.S.C. 154(b) by 7 days.

(21) Appl. No.: 14/424,928

(22) PCT Filed: Sep. 13, 2013

(86) PCT No.: PCT/KR2013/008307
§ 371 (c)(1),
(2) Date: Feb. 27, 2015

(87) PCT Pub. No.: WO2014/042464
PCT Pub. Date: Mar. 20, 2014

(65) Prior Publication Data
US 2015/0222447 A1    Aug. 6, 2015

Related U.S. Application Data

(60) Provisional application No. 61/701,658, filed on Sep. 16, 2012, provisional application No. 61/700,896, filed on Sep. 14, 2012.

(51) Int. Cl.
*H04W 4/00* (2009.01)
*H04L 12/18* (2006.01)
(Continued)

(52) U.S. Cl.
CPC ........... *H04L 12/189* (2013.01); *H04L 5/0044* (2013.01); *H04W 4/06* (2013.01); *H04W 48/16* (2013.01); *H04W 84/12* (2013.01)

(58) Field of Classification Search
CPC ....... H04L 5/0084; H04L 12/189; H04W 4/06; H04W 84/12
(Continued)

(56) References Cited

U.S. PATENT DOCUMENTS

| 6,834,045 | B1 * | 12/2004 | Lappetelainen | ...... H04W 40/00 370/329 |
| 2007/0076649 | A1 * | 4/2007 | Lin | ..................... H04W 76/025 370/328 |

(Continued)

FOREIGN PATENT DOCUMENTS

| KR | 10-2004-0067419 | 7/2004 |
| KR | 10-2007-0018786 | 2/2007 |

(Continued)

OTHER PUBLICATIONS

PCT International Application No. PCT/KR2013/008307, Written Opinion of the International Searching Authority dated Dec. 27, 2013, 1 page.

(Continued)

*Primary Examiner* — Farah Faroul
(74) *Attorney, Agent, or Firm* — Lee Hong Degerman Kang & Waimey

(57) ABSTRACT

Disclosed are a method and an apparatus for scanning in a wireless Local Area Network (LAN). A method for scanning by a station (STA) comprises the steps of: the STA generating a Medium Access Control (MAC) layer management entity (MLME)-SCAN.request primitive comprising information for a basic service set identifier (BSSID) and a service set identifier (SSID); the STA generating a probe request frame comprising wildcard BSSID and SSID; the STA multi-casting the probe request frame to a first Access Point (AP) forming an extended service set (ESS) network using a particular SSID; and the STA receiving a probe
(Continued)

response frame broadcast from the first AP as a response to the probe request frame.

10 Claims, 17 Drawing Sheets

(51) Int. Cl.
    *H04W 48/16*     (2009.01)
    *H04L 5/00*     (2006.01)
    *H04W 4/06*     (2009.01)
    *H04W 84/12*     (2009.01)

(58) Field of Classification Search
    USPC . 370/312, 328–329, 389, 390, 392; 455/434
    See application file for complete search history.

(56) References Cited

U.S. PATENT DOCUMENTS

| | | | |
|---|---|---|---|
| 2007/0180344 A1* | 8/2007 | Jacobsen | H03M 13/1105 714/752 |
| 2010/0296500 A1* | 11/2010 | Tang | H04W 48/20 370/338 |
| 2010/0303096 A1* | 12/2010 | Kasher | H04L 1/007 370/474 |
| 2011/0231559 A1* | 9/2011 | Yamaguchi | H04W 48/20 709/228 |
| 2012/0307685 A1* | 12/2012 | Kim | H04W 48/16 370/255 |
| 2013/0188628 A1* | 7/2013 | Lee | H04W 48/16 370/338 |
| 2013/0230035 A1* | 9/2013 | Grandhi | H04W 48/16 370/338 |
| 2013/0294354 A1* | 11/2013 | Zhang | H04W 72/04 370/329 |
| 2014/0010157 A1* | 1/2014 | Hsieh | H04W 48/16 370/328 |
| 2014/0242985 A1* | 8/2014 | Kneckt | H04W 48/16 455/434 |
| 2015/0098358 A1* | 4/2015 | Park | H04W 48/16 370/254 |

FOREIGN PATENT DOCUMENTS

| | | |
|---|---|---|
| KR | 10-2011-0085836 | 7/2011 |
| KR | 10-2012-0079055 | 7/2012 |

OTHER PUBLICATIONS

Park, et al., "Step-Wise Active Scanning in TGai," doc.: IEEE 802.11-12/0257r1, Mar. 2012, 10 pages.

* cited by examiner

FIG. 6
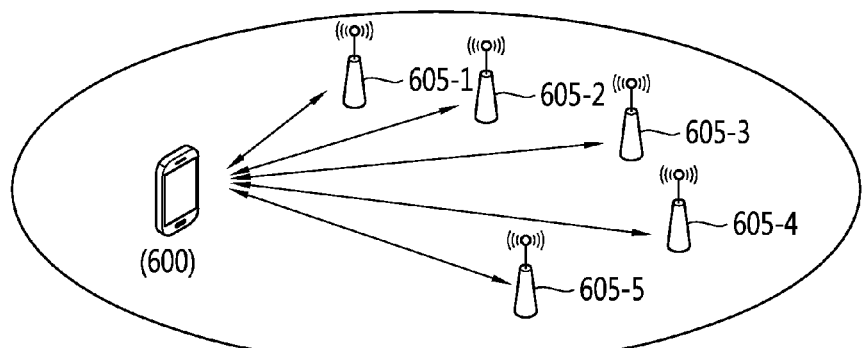
probe request frame (610)
(wildcard, SSID, wildcard BSSID)
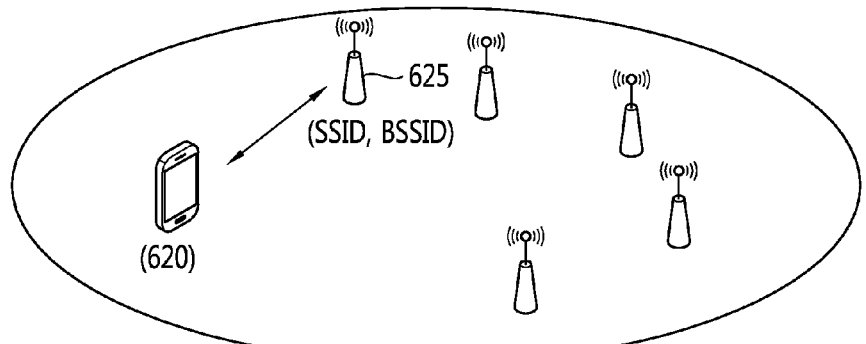
probe request frame (630)
(SSID, BSSID)
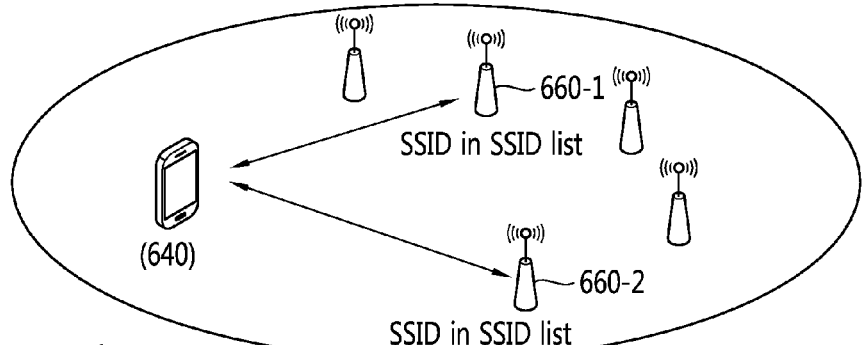
probe request frame (660)
(SSID, wildcard BSSID)

FIG. 9
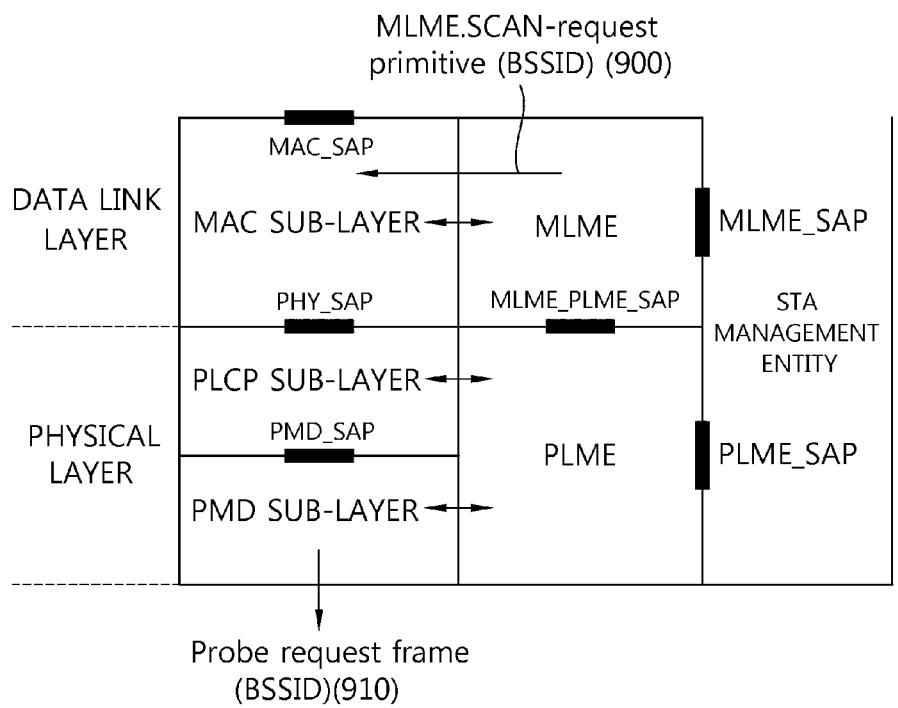
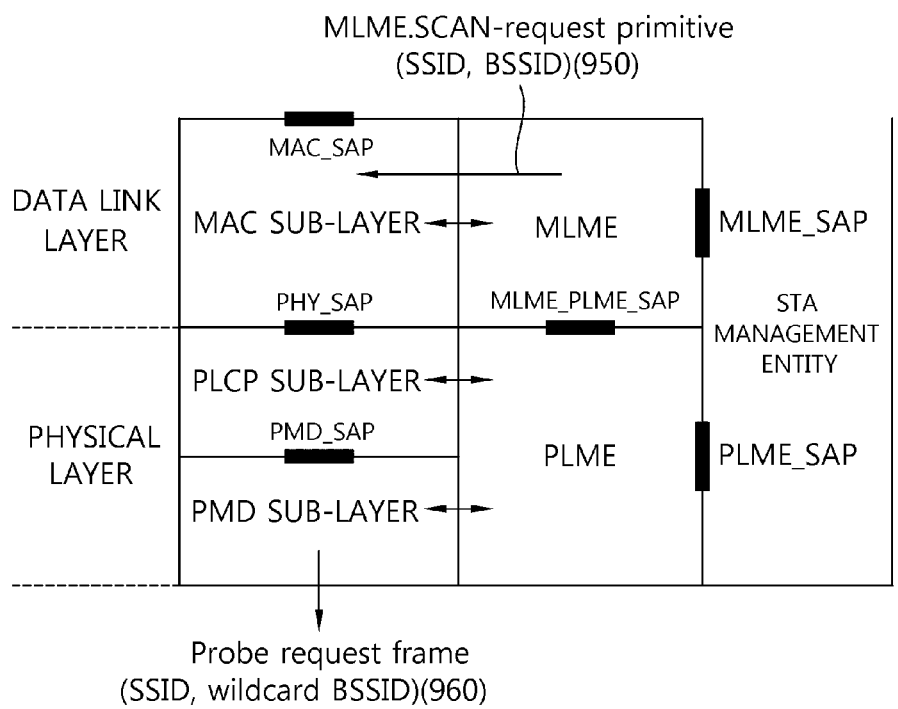

FIG. 12

| MAC header | SSID (1200) | Notice scanning channel (1220) | Channel switching timing (1240) | ... |

FIG. 14

| MAC header | Switching channel (1400) | Switching timing (1450) | ... |

METHOD AND APPARATUS FOR SCANNING IN WIRELESS LAN

CROSS-REFERENCE TO RELATED APPLICATIONS

This application is the National Stage filing under 35 U.S.C. 371 of International Application No. PCT/KR2013/008307, filed on Sep. 13, 2013, which claims the benefit of U.S. Provisional Application Ser. Nos. 61/700,896, filed on Sep. 14, 2012 and 61/701,658, filed on Sep. 16, 2012, the contents of which are all hereby incorporated by reference herein in their entirety.

BACKGROUND OF THE INVENTION

1. Field of the Invention

The present invention relates to a scanning method and apparatus and, more particularly, to a scanning method and apparatus by a station (STA).

2. Related Art

Recent Wireless LAN (WLAN) technology is basically evolving into three directions. There are Institute of Electrical and Electronic Engineers (IEEE) 802.11ac and IEEE 802.11 ad as efforts to further increase the transfer rate on the extension line of the existing WLAN evolution direction. IEEE 802.11 ad is WLAN technology using a 60 GHz band. Furthermore, a wide area WLAN that utilizes a frequency band of less than 1 GHz in order to enable wider area transfer than that of the existing WLAN in distance is recently emerging. The wide-area WLAN includes IEEE 802.11af utilizing a TV White Space (TVWS) band and IEEE 802.11ah utilizing a 900 MHz band. A main object of the wide-area WLANs is to extend extended range Wi-Fi service as well as a smart grid and a wide-area sensor network. Furthermore, the existing WLAN Medium Access Control (MAC) technology is problematic in that an initial link setup time is very long according to circumstances. In order to solve this problem and in order for an STA to rapidly access an AP, IEEE 802.11ai standardization is recently carried out actively.

IEEE 802.11ai is MAC technology in which a rapid authentication procedure is handled in order to significantly reduce the initial setup and association time of a WLAN, and standardization activities for IEEE 802.11ai has started as a formal task group on January, 2011. In order to enable a rapid access procedure, in IEEE 802.11ai, a discussion on procedure simplification in fields, such as AP discovery, network discovery, Time Synchronization Function (TSF) synchronization, authentication & association, and a procedure convergence with a higher layer, is in progress. From among them, ideas, such as procedure convergence utilizing the piggyback of a Dynamic Host Configuration Protocol (DHCP), the optimization of a full Extensible Authentication Protocol (EAP) using a concurrent IP, and efficient and selective Access Point (AP) scanning, are being actively discussed.

SUMMARY OF THE INVENTION

An object of the present invention is to provide a scanning method.

Another object of the present invention is to provide an apparatus for performing a scanning method.

In an aspect, a scanning method performed by a station (STA) may include generating, by the STA, a MAC layer management entity (MLME).SCAN-request primitive of which a frame including information of a basic service set identifier (BSSID) and a service set identifier (SSID) are specified, generating, by the STA, a probe request frame including a wildcard BSSID and the SSID based on the MLME.SCAN-request primitive, multicasting, by the STA, the probe request frame to an AP that embodies an extended service set (ESS) network specified by the SSID, and receiving, by the STA, the probe response frame which is broadcasted by the AP in response to the probe request frame.

In another aspect, a station (STA) operated in a wireless LAN may include a radio frequency (RF) unit receiving a wireless signal, and a processor selectively connected to the RF unit, wherein the processor is configured to perform, generating a MAC layer management entity (MLME). SCAN-request primitive of which a frame including information of a basic service set identifier (BSSID) and a service set identifier (SSID) are specified, generating a probe request frame including a wildcard BSSID and the SSID based on the MLME. SCAN-request primitive, multicasting the probe request frame to an AP that embodies an extended service set (ESS) network specified by the SSID, and receiving the probe response frame which is broadcasted by the AP in response to the probe request frame.

An initial access procedure can be quickly performed.

BRIEF DESCRIPTION OF THE DRAWINGS

FIG. 6 is a conceptual diagram illustrating a method of transmitting a probe request frame.

FIG. 9 is a conceptual diagram illustrating a method for generating the probe request frame of an STA according to an embodiment of the present invention.

FIG. 12 is a conceptual diagram illustrating a scanning notice frame according to an embodiment of the present invention.

FIG. 14 is a conceptual diagram illustrating a channel switching frame according to an embodiment of the present invention.

DESCRIPTION OF EXEMPLARY EMBODIMENTS

FIG. 1 is a concept view illustrating the structure of a wireless local area network (WLAN).

Figure 1A:
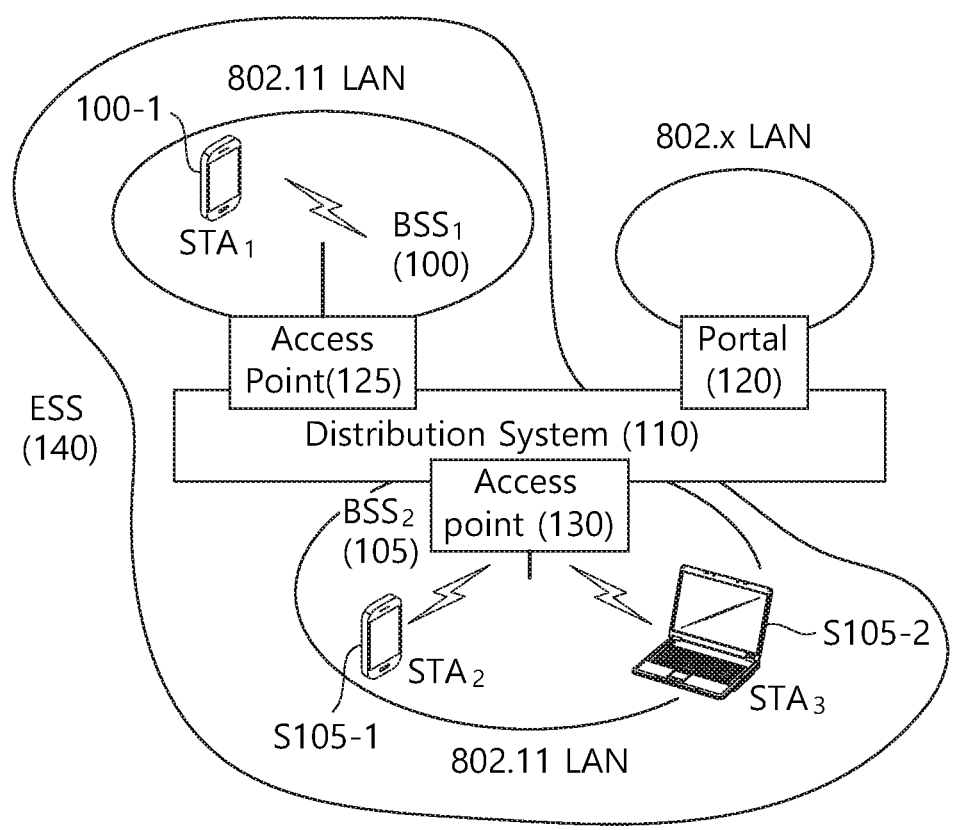
FIG. 1 is a conceptual diagram illustrating the configuration of a Wireless Local Area Network (WLAN).

The FIG. 1A shows the structure of the IEEE (institute of electrical and electronic engineers) 802.11 infrastructure network.

Referring to the FIG. 1A, the WLAN system may include one or more basic service sets (BSSs, 100 and 105). The BSS 100 or 105 is a set of an AP such as AP (access point) 125 and an STA such as STA1 (station) 100-1 that may successfully sync with each other to communicate with each other and is not the concept to indicate a particular area. The BSS 105 may include one AP 130 and one or more STAs 105-1 and 105-2 connectable to the AP 130.

The infrastructure BSS may include at least one STA, APs 125 and 130 providing a distribution service, and a distribution system (DS) 110 connecting multiple APs.

The distribution system 110 may implement an extended service set (ESS) 140 by connecting a number of BSSs 100 and 105. The ESS 140 may be used as a term to denote one network configured of one or more APs 125 and 230 connected via the distribution system 110. The APs included in one ESS 140 may have the same SSID (service set identification).

The portal 120 may function as a bridge that performs connection of the WLAN network (IEEE 802.11) with other network (for example, 802.X).

In the infrastructure network as shown in the FIG. 1A, a network between the APs 125 and 130 and a network between the APs 125 and 130 and the STAs 100-1, 105-1, and 105-2 may be implemented. However, without the APs 125 and 130, a network may be established between the STAs to perform communication. The network that is established between the STAs without the APs 125 and 130 to perform communication is defined as an ad-hoc network or an independent BSS (basic service set).

Figure 1B:
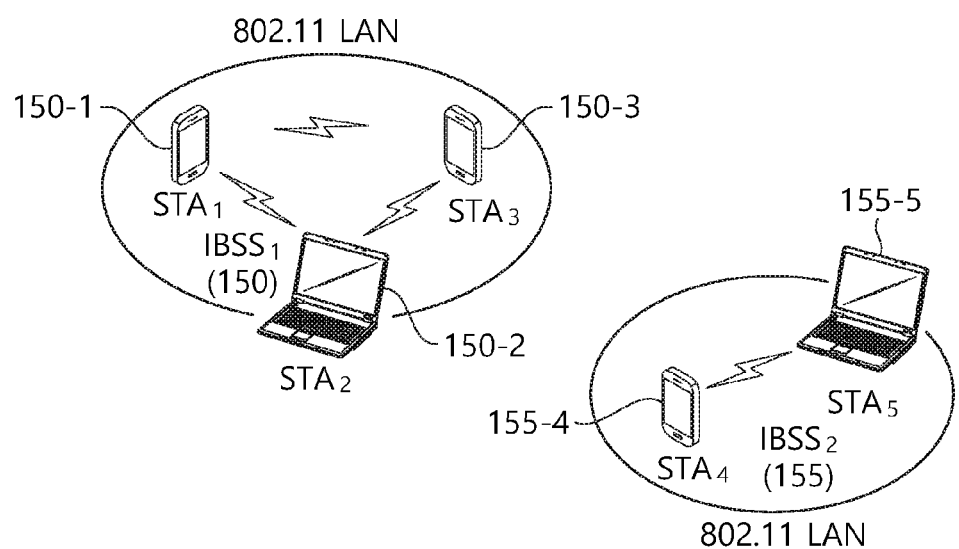

The FIG. 1B is a concept view illustrating an independent BSS.

Referring to the FIG. 1B, the independent BSS (IBSS) is a BSS operating in ad-hoc mode. The IBSS does not include an AP, so that it lacks a centralized management entity. In other words, in the IBSS, the STAs 150-1, 150-2, 150-3, 155-4, and 155-5 are managed in a distributed manner. In the IBSS, all of the STAs 150-1, 150-2, 150-3, 155-4, and 155-5 may be mobile STAs, and access to the distribution system is not allowed so that the IBSS forms a self-contained network.

The STA is some functional medium that includes a medium access control (MAC) following the IEEE (Institute of Electrical and Electronics Engineers) 802.11 standards and that includes a physical layer interface for radio media, and the term "STA" may, in its definition, include both an AP and a non-AP STA (station).

The STA may be referred to by various terms such as mobile terminal, wireless device, wireless transmit/receive unit (WTRU), user equipment (UE), mobile station (MS), mobile subscriber unit, or simply referred to as a user.

Figure 2:
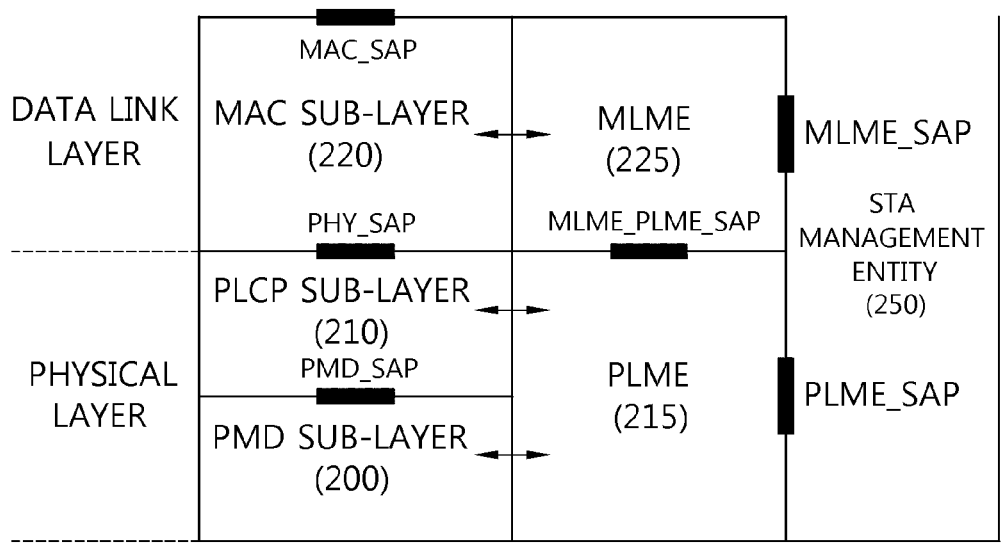
FIG. 2 is a diagram illustrating the hierarchical architecture of a WLAN system that is supported by IEEE 802.11.

FIG. 2 is a view illustrating a layer architecture of a WLAN system supported by IEEE 802.11.

FIG. 2 conceptually illustrates a layer architecture (PHY architecture) of a WLAN system.

The WLAN system layer architecture may include an MAC (medium access control) sub-layer 220, a PLCP (Physical Layer Convergence Procedure) sub-layer 210, and a PMD (Physical Medium Dependent) sub-layer 200. The PLCP sub-layer 210 is implemented so that the MAC sub-layer 220 is operated with the minimum dependency upon the PMD sub-layer 200. The PMD sub-layer 200 may serve as a transmission interface to communicate data between a plurality of STAs.

The MAC sub-layer 220, the PLCP sub-layer 210, and the PMD sub-layer 200 may conceptually include management entities.

The management entity of the MAC sub-layer 220 is denoted an MLME (MAC layer management entity, 225), and the management entity of the physical layer is denoted a PLME (PHY layer management entity, 215). Such management entities may offer an interface where a layer management operation is conducted. The PLME 215 is connected with the MLME 225 to be able to perform a management operation on the PLCP sub-layer 210 and the PMD sub-layer 200, and the MLME 225 is also connected with the PLME 215 to be able to perform a management operation on the MAC sub-layer 220.

There may be an SME (STA management entity, 250) to perform a proper MAC layer operation. The SME 250 may be operated as a layer independent component. The MLME, PLME, and SME may communicate information between the mutual components based on primitive.

The operation of each sub-layer is briefly described below. The PLCP sub-layer 110 delivers an MPDU (MAC protocol data unit) received from the MAC sub-layer 220 according to an instruction from the MAC layer between the MAC sub-layer 220 and the PMD sub-layer 200 to the PMD sub-layer 200 or delivers a frame from the PMD sub-layer 200 to the MAC sub-layer 220. The PMD sub-layer 200 is a PLCP sub-layer and the PMD sub-layer 200 may communicate data between a plurality of STAs by way of a radio medium. The MPDU (MAC protocol data unit) delivered from the MAC sub-layer 220 is denoted a PSDU (Physical Service Data Unit) on the side of the PLCP sub-layer 210. The MPDU is similar to the PSDU, but in case an A-MPDU (aggregated MPDU), which is obtained by aggregating a plurality of MPDUs, has been delivered, each MPDUs may differ from the PSDU.

The PLCP sub-layer 210 adds an additional field including information required by the physical layer transceiver while receiving the PSDU from the MAC sub-layer 220 and delivering the same to the PMD sub-layer 200. In this case, the added field may include a PLCP preamble to the PSDU, a PLCP header, and tail bits necessary to return the convolution encoder to zero state. The PLCP preamble may play a role to allow the receiver to prepare for syncing and antenna diversity before the PSDU is transmitted. The data field may include padding bits to the PSDU, a service field including a bit sequence to initialize the scrambler, and a coded sequence in which a bit sequence added with tail bits has been encoded. In this case, as the encoding scheme, one of BCC (Binary Convolutional Coding) encoding or LDPC (Low Density Parity Check) encoding may be selected depending on the encoding scheme supported by the STA receiving the PPDU. The PLCP header may include a field containing information on the PPDU (PLCP Protocol Data Unit) to be transmitted.

The PLCP sub-layer 210 adds the above-described fields to the PSDU to generate the PPDU (PLCP Protocol Data Unit) and transmits the same to a receiving station via the PMD sub-layer 200, and the receiving station receives the PPDU and obtains information necessary for data restoration from the PLCP preamble and PLCP header to thus restore the same.

Figure 3:
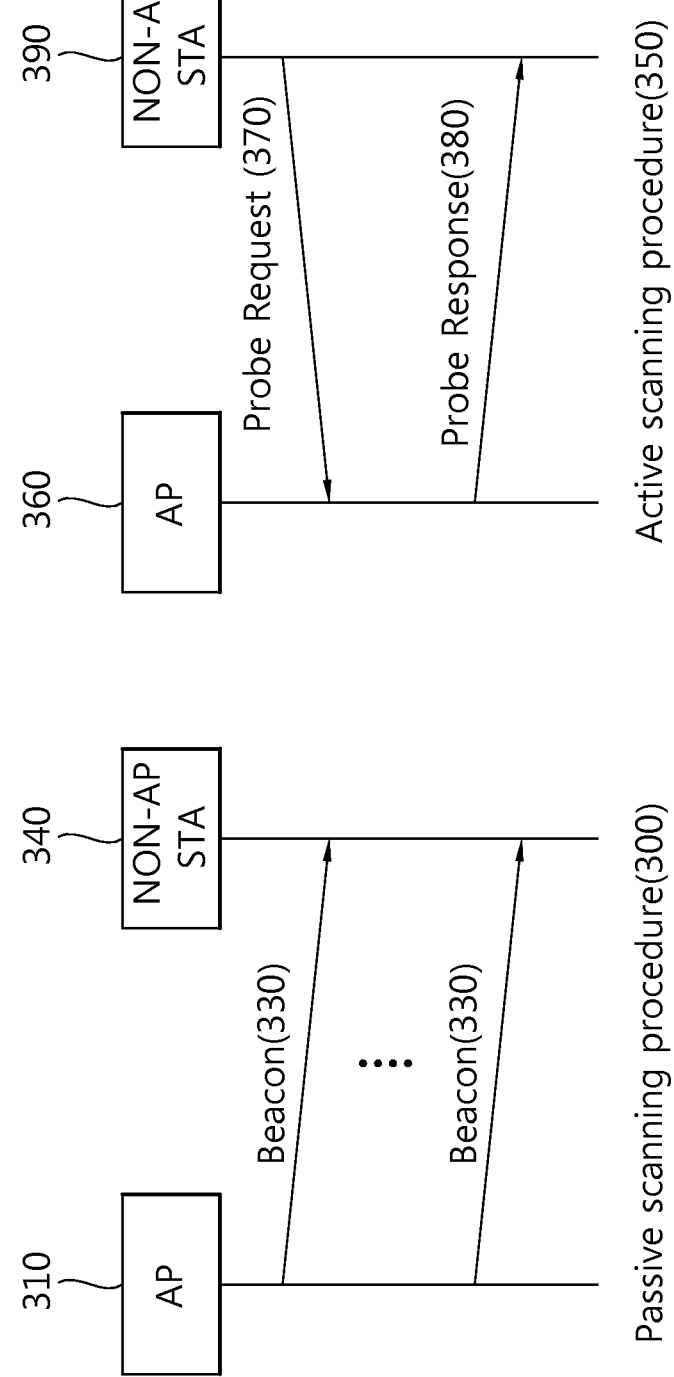
FIG. 3 is a conceptual diagram illustrating a scanning method in a WLAN.

FIG. 3 is a concept view illustrating a scanning method in a WLAN.

Referring to FIG. 3, the scanning method may be divided into passive scanning 300 and active scanning 350.

Referring to the left part of FIG. 3, the passive scanning 300 may be performed by a beacon frame 330 that is periodically broadcast from the AP 300. The AP 300 in the WLAN broadcasts the beacon frame 330 to the non-AP STA 340 at a particular period (e.g., per 100 msec). The beacon frame 330 may contain information on the current network. The non-AP STA 340 may perform scanning on the channel with the AP 310 to perform the authentication/association process by obtaining the network information from the beacon frame 330 periodically broadcast.

The passive scanning method 300 only receives the beacon frame 330 transmitted from the AP 310 without the need for the non-AP STA 340 to transmit a frame. Accordingly, the passive scanning 300 is advantageous of a reduction in the overall overhead that is created upon data transmission/reception over the network. However, since the scanning is obliged to be passively performed in proportion to the period of the beacon frame 330, the time taken to perform scanning may be increased. The details of the beacon frame are set forth in IEEE Draft P802.11-REVmb™/D12, November 2011 'IEEE Standard for Information Technology Telecommunications and information exchange between systems—Local and metropolitan area networks—Specific requirements Part 11: Wireless LAN Medium Access Control (MAC) and Physical Layer (PHY) Specifications (hereinafter, IEEE 802.11)' 8.3.3.2 beacon frame disclosed on November, 2011. IEEE 802.11ai may additionally use other format of a beacon frame, and such beacon frame may be referred to as a FILS (fast initial link setup) beacon frame. Further, the measurement pilot frame is a frame containing only some information of the beacon frame, and the measurement pilot frame may be used in the scanning procedure. The measurement pilot frame is set forth in IEEE 802.11 8.5.8.3 measurement pilot format.

Also, a fast initial link setup (FILS) discovery frame may be defined. The FILS discovery frame is a frame transmitted between each of the transmission periods in each AP, may be a frame transmitted with a shorter period than the beacon frame. That is, the FILS discovery frame is a frame transmitted with a shorter period than a transmission period of the beacon frame. The FILS discovery frame may include identification information (SSID, BSSID) of an AP that transmits the FILS discovery frame. It may be implemented that the FILS discovery frame is transmitted to an STA before the beacon frame is transmitted, and thus, the STA may search that an AP is existed in the corresponding channel beforehand. An interval of which the FILS discovery frame is transmitted in one AP is referred to as an FILS discovery frame transmission interval. The FILS discovery frame may be transmitted with a part of information included in the beacon frame being included. The FILS discovery frame may also include information for a transmission time of the beacon frame of neighbor AP.

Referring to the right part of FIG. 3, the active scanning 350 refers to a method in which the non-AP STA 390 leads scanning by transmitting a probe request frame 370 to the AP 360.

After receiving the probe request frame 370 from the non-AP STA 390, the AP 360 may wait a random time to prevent frame collision, and the AP 360 then includes network information in a frame response frame 380, then sending the same to the non-AP STA 390. The non-AP STA 390 may obtain the network information based on the received probe response frame 380 to stop the scanning process.

The active scanning 350 allows the non-AP STA 390 to lead the scanning process, and the active scanning 350 has the advantage of a short scanning time. However, the non-AP STA 390 should transmit the probe request frame 37, resulting in an increase in the network overhead for frame transmission and reception. The probe request frame 370 is set forth in IEEE 802.11 Ch. 8.3.3.9, and the probe response frame 380 is set forth in IEEE 802.11 Ch. 8.3.3.10.

After the scanning is done, the AP and the STA may conduct an authentication and association procedure.

Figure 4:
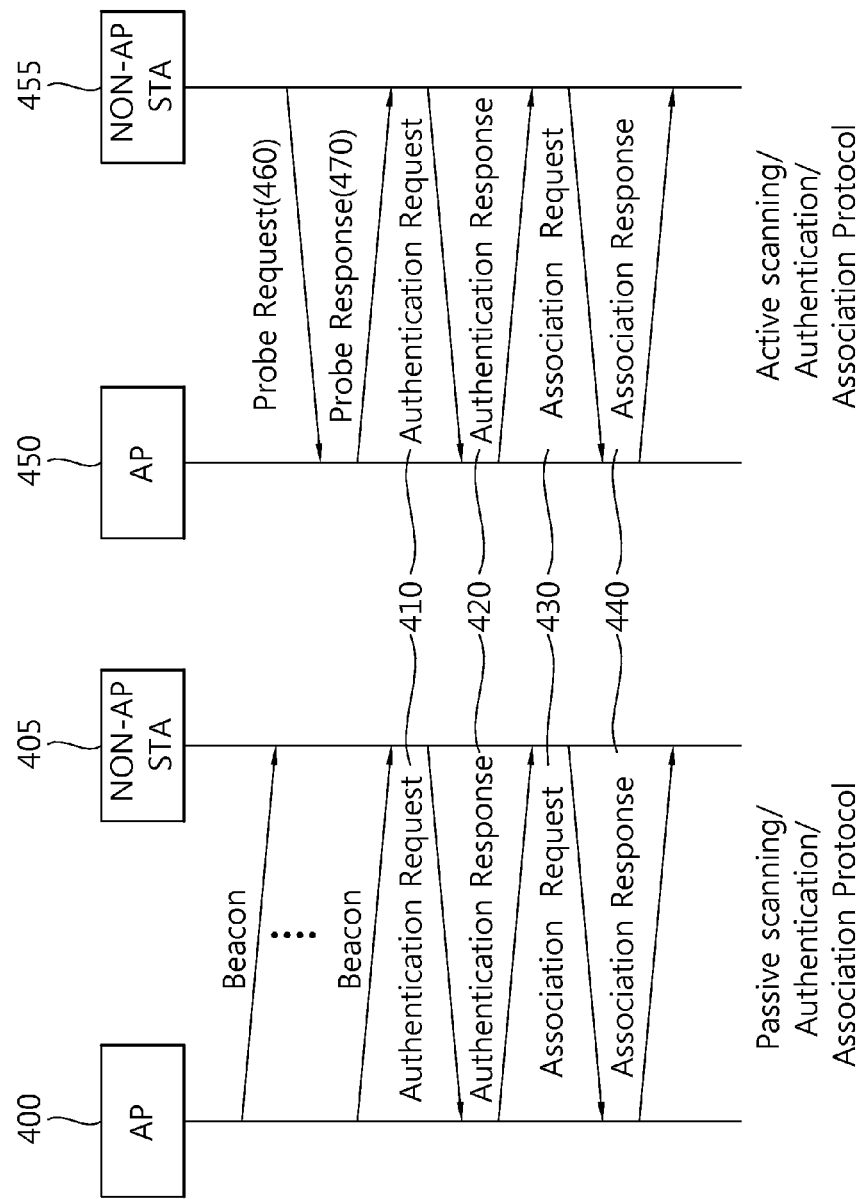
FIG. 4 is a conceptual diagram illustrating authentication and association processes after the scanning of an AP and an STA.

FIG. 4 is a concept view illustrating an authentication and association process after scanning between an AP and an STA.

Referring to FIG. 4, after passive/active scanning, the authentication and association may be conducted with one of the scanned APs.

The authentication and association process may be carried out by way of, e.g., 2-way handshaking. The left part of FIG. 4 is a concept view illustrating an authentication and association process after passive scanning, and the right part of FIG. 4 is a concept view illustrating an authentication and association after active scanning.

The authentication and association process may be equally performed by exchanging an authentication request frame 410/authentication response frame 420 and an association request frame 330/association response frame 440 between the AP 400 or 450 and the non-AP STA 405 or 455 regardless of which one of the active scanning method and the passive scanning method has been used.

The authentication process may be conducted by transmitting the authentication request frame 410 from the non-AP STA 405 or 455 to the AP 400 or 450. In response to the authentication request frame 410, the authentication response frame 420 may be transmitted from the AP 400 or 450 to the non-AP STA 405 or 455. The authentication frame format is set forth in IEEE 802.11 Ch. 8.3.3.11.

The association process may be conducted by transmitting the association request frame 430 from the non-AP STA 405 or 455 to the AP 400 or 405. In response to the association request frame 430, the association response frame 440 may be transmitted from the AP 405 or 455 to the non-AP STA 400 or 450. The transmitted association request frame 430 contains information on the capability of the non-AP STA 405 or 455. Based on the information on the capability of the non-AP STA 405 or 455, the AP 400 or 350 may determine whether the non-AP STA 405 or 355 may be supported. In case such support is possible, the AP 300 or 450 may include in the association response frame 440 whether to accept the association request frame 440 and a reason therefore, and its supportable capability information, and the AP 300 or 450 may send the same to the non-AP STA 405 or 455. The association frame format is set forth in IEEE 802.11 Chs. 8.3.3.5/8.3.3.6.

After the association step is done, normal data transmission and reception is carried out. The association, unless done, is re-conducted based on the reason for which the association is not performed, or association with other AP may be performed.

Figure 5:
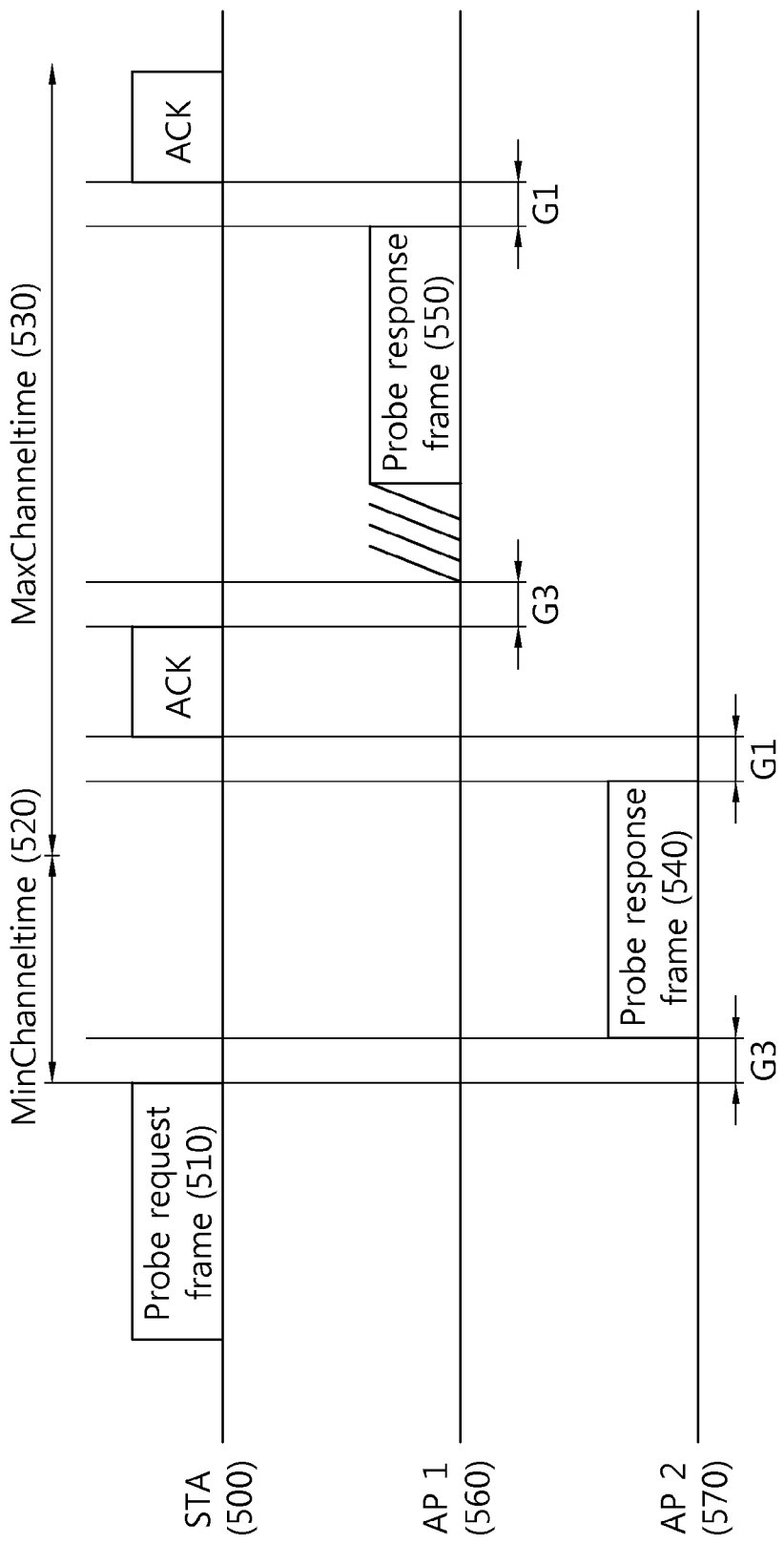
FIG. 5 is a conceptual diagram illustrating an active scanning procedure.

FIG. 5 is a concept view illustrating an active scanning procedure.

Referring to FIG. 5, the active scanning procedure may be performed in the following steps.

(1) It is determined whether the STA 500 is ready to perform the scanning procedure.

The STA 500 may wait, e.g., until the probe delay time expires or particular signaling information (for example, PHY-RXSTART.indication primitive) is received to perform active scanning.

The probe delay time is a delay that occurs before the STA 500 sends a probe request frame 510 when performing active scanning. PHY-RXSTART.indication primitive is a signal that is transmitted from the physical (PHY) layer to the local MAC (medium access control) layer. PHY-RXSTART.indication primitive may signal information indicating that the PLCP (physical layer convergence protocol) has received a PPDU (PLCP protocol data unit) including a valid PLCP header to the MAC layer.

(2) Basic access is performed.

In the 802.11 MAC layer, a number of STAs may share a radio medium using a distributed coordination function (DCF) that is a contention-based function. The DCF may prevent collision between STAs through a back-off scheme using the carrier sense multiple access/collision avoidance (CSMA/CA) as its access protocol. The STA 500 may transmit the probe request frame 510 to the APs 560 and 570 using a basic access method.

(3) Information for specifying the APs 560 and 570 included in MLME-SCAN.request primitive (for example, SSID (service set identification) and BSSID (basic service set identification) information) may be included in the probe request frame 510 and may be transmitted.

The BSSID may have a value corresponding to the MAC address of the AP as an indicator to specify the AP. The SSID (service set identification) is a network term for specifying an AP, which may be read by a person who operates the STA. The BSSID and/or SSID may be used to specify an AP.

The STA 500 may specify an AP based on the information to specify the APs 560 and 570 included by MLME-SCAN.request primitive. The specified APs 560 and 570 may send the probe response frames 550 and 550 to the STA 500. The STA 500 may include the SSID and BSSID information in the probe request frame 510 and send the same, thereby unicasting, multicasting, or broadcasting the probe request frame 510. A method of unicasting, multicasting, or broadcasting the probe request frame 510 using the SSID and BSSID information is further described with reference to FIG. 5.

For example, in case an SSID list is included in MLME-SCAN.request primitive, the STA 500 may include the SSID list in the probe request frame 510 and transmit the same. The APs 560 and 570 may receive the probe request frame 510, determine the SSIDs included in the SSID list contained in the received probe request frame 510, and determine whether to send the probe response frames 550 and 550 to the STA 200.

(4) A probe timer is initialized as 0 and is then operated.

The probe timer may be used to check a minimum channel time (MinChanneltime, 520) and a maximum channel time (MaxChanneltime, 530). The minimum channel time 520 and the maximum channel time 530 may be used to control the active scanning operation of the STA 500.

The minimum channel time 520 may be used to perform the operation for varying the channel for conducting active scanning. For example, in case the STA 500 fails to receive the probe response frames 550 and 550 until a probe timer reaches the minimum channel time 520, the STA 500 shifts scanning channels to perform scanning on other channel. In case the STA 500 receives the probe response frame 550 until the probe timer reaches the minimum channel time 520, it may process the received probe response frames 540 and 550 after waiting until the probe timer reaches the maximum channel time 530.

The STA 500 may detect PHY-CCA.indication primitive until the probe timer reaches the minimum channel time 520 and may determine whether other frame (for example, probe response frames 540 and 550) has been received by the STA 500 until before the minimum channel time 520.

PHY-CCA.indication primitive may transmit information on the state of the medium from the physical layer to the MAC layer. PHY-CCA.indication primitive may indicate the current state of the channel using channel state parameters such as "busy" when the channel is unavailable and "idle" when the channel is available. The STA 500 may determine that there are probe response frames 550 and 550 received by the STA 500 when PHY-CCA.indication is detected to be busy and may determine that there are no probe response frames 550 and 550 received by the STA 500 when PHY-CCA.indication is detected to be idle.

In case PHY-CCA.indication is detected to be idle, the STA 500 may set an NAV (net allocation vector) to 0, and the STA 500 may scan a next channel. In case PHY-CCA.indication is detected to be busy, the STA 500 may perform a process on the received probe response frames 550 and 550 after the probe timer reaches the maximum channel time 530. After the process on the received probe response frames 550 and 550 is done, the STA 500 may set the NAV (net allocation vector) to 0 and may then scan a next channel.

Hereinafter, in embodiments of the present invention, determining whether there are probe response frames 550 and 550 received by the STA 500 may also mean that the channel state is determined using PHY-CCA.indication primitive.

(5) In case all the channels included in the channel list (ChannelList) are scanned, the MLME may signal MLME-SCAN.confirm primitive. MLME-SCAN.confirm primitive may contain BSSDescriptionSet including all the information obtained in the scanning process.

In case the STA 500 uses the active scanning method, the STA 500 should perform monitoring to determine whether the parameter of PHY-CCA.indication is busy until the probe timer reaches the minimum channel time.

The specific information included in the above-described MLME-SCAN is as follows. In order for the STA to perform scanning, the MLME may receive MLME-SCAN.request primitive. MLME-SCAN.request primitive is a primitive created by the SME. MLME-SCAN.request primitive may be used to determine whether there is other BSS to which the STA is to be connected.

MLME-SCAN.request primitive may contain information specifically such as BSSType, BSSID, SSID, ScanType, ProbeDelay, ChannelList, MinChannelTime, MaxChannelTime, RequestInformation, SSID List, ChannelUsage, AccessNetworkType, HESSID, MeshID, VendorSpecificInfo. The details of MLME-SCAN.request primitive are set forth in IEEE Draft P802.11-REVmb™/D12, November 2011 'IEEE Standard for Information Technology Telecommunications and information exchange between systems—Local and metropolitan area networks—Specific requirements Part 11: Wireless LAN Medium Access Control (MAC) and Physical Layer (PHY) Specifications' 6.3.3.2 MLME-SCAN.request disclosed on November, 2011.

The following Table 1 briefly represents example information included in MLME-SCAN.request primitive.

TABLE 1

| name | description |
|---|---|
| BSSType | Determines whether infrastructure BSS, IBSS, MBSS (Mesh basic service set), or all, are included in the scan |
| BSSID | Identifies a specific or wildcard BSSID |
| SSID | Specifies the desired SSID or the wildcard SSID |
| ScanType | Indicates either active or passive scanning |
| ProbeDelay | Delay(in microseconds) to be used prior to transmitting a probe frame during active scanning |
| ChannelList | Specifies a list of channels that are examined when scanning for a BSS |
| MinChannelTime | The minimum time(in TU) to spend on each channel when scanning |
| MaxChannelTime | The maximum tine(in TU) to spend on each channel when scanning |
| RequirementInformation | This element is optionally present if dot11RadioMeasurementActivated is true and is placed in a Probe Request frame to request that the responding STA include the requested information in the Probe Response frame |
| SSID List | One or more SSID elements that are optionally present when dot11MgmtOptionSSIDListActivated is true |
| ChannelUsage | Specific request types for the ChannelUsage request |
| AccessNetworkType | Specifies a desired specific access network type or the wildcard access network type |
| HESSID | Specifies the desired specific HESSID network identifier or the wildcard network identifier. This field is present when dot11InterworkingSeviceActivated is true |
| Mesh ID | Only present if BSSType = MESH or BSSType = ANY_BSS. Specifies the desired Mesh ID or wildcard Mesh ID. |
| RequestParameters | The parameters define the responding STAs |
| ReportingOption | Indicates the result reporting mode |
| APConfigurationChangeCount | When a specific BSSID is indicated in the MLME-SCAN.request, the APConfigurationChangeCount associated with the stored configuration of the AP is optionally provided |
| VendorSpecificInfo | Information added according to each of vendors |

The request parameter included in MLME-SCAN.request primitive may be used to determine whether the responding STA is to transmit a probe response frame. The request parameter may contain information for requesting that other BSS's information be included in the probe response frame. Also, the request parameter may include a report request field, a delay reference field, and a maximum delay limit field.

The report request field contains information to request that other BSS's information be included in the probe response frame, the delay reference field contains information on the delay type applied as a response to the probe request frame, and the maximum delay limit field may contain the maximum access delay information on the delay type indicated by the delay reference field.

Besides, the request parameter may include a minimum data rate field and/or a received signal strength limit field. The minimum data rate field contains information on the lowest overall data rate in transmitting an MSDU or A-MSDU. The received signal strength limit field may further contain information on the limit value of the signal necessary for a recipient of the probe request frame to respond.

FIG. 6 is a concept view illustrating a probe request frame transmission method.

FIG. 6 discloses methods of broadcasting, multicasting, and unicasting probe request frames from an STA.

The upper part of FIG. 6 shows a method in which the STA 600 broadcasts the probe request frame 610.

The STA 600 may include a wildcard SSID and a wildcard BSSID in the probe request frame 610 and broadcast the probe request frame 610.

The wildcard SSID and the wildcard BSSID may be used as identifiers to indicate all of the APs 606-1, 606-2, 606-3, 606-4, and 606-6 included in the transmission range of the STA 600.

In case the STA 600 transmits the probe request frame 610 with the wildcard SSID and the wildcard BSSID included in the probe request frame 610, the APs 606-1, 606-2, 606-3, 606-4, and 606-6 that have received the probe request frame 610 from the STA 600 may send probe response frames to the STA 600 in response to the received probe request frame.

In case the APs 606-1, 606-2, 606-3, 606-4, and 606-6 that have received the broadcast probe request frame 610 send the probe response frames to the STA 600 in response to the received probe request frame 610 within a predetermined time, the problem may occur that the STA 600 should simultaneously receive and process too many probe response frames.

The middle part of FIG. 6 shows a method in which the STA 620 unicasts the probe request frame 630.

Referring to the middle part of FIG. 6, in case the STA 620 unicasts the probe request frame 630, the STA 620 may transmit the probe request frame 630 containing particular SSID/BSSID information of the AP. Among the APs that receive the probe request frame 630, only the AP 626 corresponding to the SSID/BSSID specified by the STA 620 may transmit a probe response frame to the STA 620.

The lower part of FIG. 6 shows a method in which the STA 640 multicasts the probe request frame 660.

Referring to the lower part of FIG. 6, the STA 640 may include an SSID list and a wildcard BSSID in the probe request frame 660 and transmit the same. Among the APs receiving the probe request frame 660, the APs 660-1 and 660-2 corresponding to the SSIDs included in the SSID list contained in the probe request frame may transmit a probe response frame to the STA 640.

As described above, before transmitting the probe request frame, the conventional STA may unicast, multicast or broadcast the probe request frame based on the SSID and the BSSID of MLME.SCAN-request primitive. The unicast, multicast or broadcast may be performed based on a configuration of the MLME. SCAN-request primitive below.

In case that the MLME.SCAN-request primitive includes a specific BSSID, the STA unicasts the probe request frame to an AP that has the specific BSSID. The specific BSSID of the AP may be included in an address field of MAC header of the probe request frame which is unicasted.

In case that a wildcard BSSID as well as the SSID or the SSID list are included in the MLME.SCAN-request primitive, the STA may multicast the probe request frame to an AP that corresponds to the SSID or the SSID list. The SSID or the SSID list may be included in the probe request frame, and the wildcard BSSID may be included in the address field of MAC header of the probe request frame.

If the wildcard SSID is included in the MLME.SCAN-request primitive, the STA may broadcast the probe request frame. The wildcard SSID may be included in the probe request frame, and the wildcard SSID may be included in the address field of MAC header.

In case that the AP receives the probe request frame from the STA, the AP may transmit a probe response frame to the STA that transmits the probe request frame. The AP may broadcast the probe response frame in the cases below.

If the AP receives the probe request frame from a plurality of STAs, the AP may determine whether to broadcast the probe response frame based on the information included in the received probe request frame. For example, if requests of the probe request frame that the STA transmits are identical, the AP may broadcast the probe request frame in order to be received by the plurality of STAs.

In addition, in a specific case, the STA may omit to transmit the probe request frame. For example, the STA may not transmit the probe request frame, if neighboring STA overhears the probe request frame which is broadcasted by the AP and contents of the probe request frame is identical to that of the probe request frame that the STA is to transmit, and if the STA receives the probe response frame that the AP broadcasts and information included in the probe response frame is identical to the information that the STA is to acquire by transmitting the probe request frame, or if the STA receives a beacon frame from a target AP before transmitting the probe request frame.

In the embodiment of the present invention, a method that an STA is able to omit transmitting the probe request frame is introduced. The STA does not transmit the probe request frame and is associated with an AP, and accordingly, the active scanning procedure can be improved compared to the conventional procedure.

In describing the conventional procedure that an AP broadcasts the probe response frame, the AP may broadcast one probe response frame only if the requests of the probe request frame that a plurality of STAs requested are identical, as described above.

In addition to this case, the present invention introduces a method that an AP transmits the probe response frame by broadcasting even in case that the AP receives the probe request frame including an SSID or an SSID list and a wildcard BSSID from one STA.

In addition, the present invention introduces a method for broadcasting the probe response frame by an AP even in case that an STA broadcasts the probe request frame including a wildcard SSID.

Figure 7:
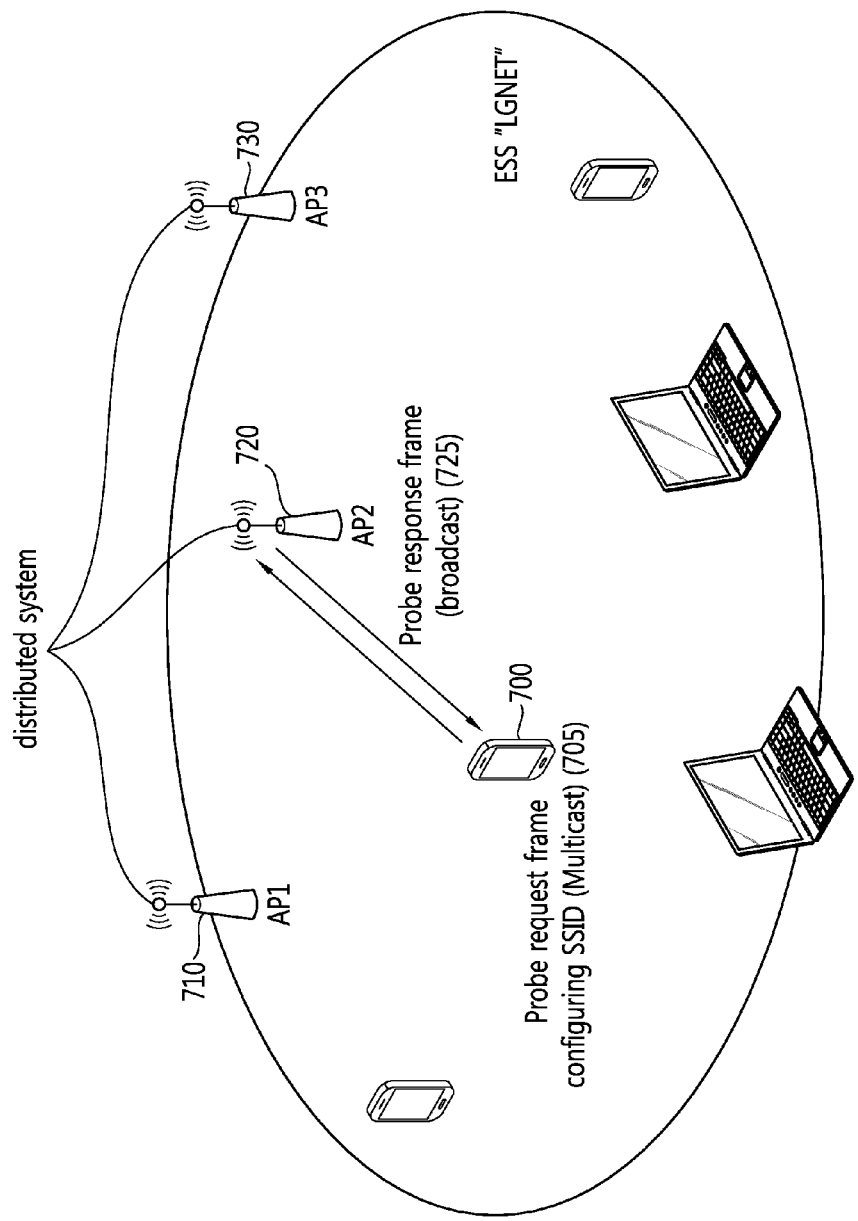
FIG. 7 is a conceptual diagram representing a method for transmitting a probe response frame according to an embodiment of the present invention.

FIG. 7 is a conceptual diagram representing a method for transmitting a probe response frame according to an embodiment of the present invention.

Hereinafter, in the embodiment of the present invention is assumed an extended service set (ESS) network. The ESS may be a wireless LAN network that is embodied in a plurality of APs 710, 720 and 730 that share an identical SSID.

In order to scan the APs 710, 720 and 730 that implement the ESS network, an STA 700 may transmit a probe request frame 705 with the SSID being included in it. In order to scan APs that implement the ESS network, another STA may transmit the probe request frame with the SSID being included in it as well. That is, the STA700 that is going to access the ESS network may multicast the probe request frame 705 including the identical SSID to the APs 710, 720, and 730 that configure the ESS network.

For example, in case of accessing the ESS network of which SSID is configured as 'LGNET', the STA 700 may configure the SSID of probe request frame to be LGNET.

The STA 700 may transmit the probe request frame 705 to AP, which includes the LGNET for the SSID and wild card BSSID for the address field of MAC address.

According to the embodiment of the present invention, in case that the AP 720 receives the probe request frame that is configured as a specific SSID and a wildcard BSSID, the AP 720 may broadcast the probe response frame 725. The STA 740 that is to perform scanning in the ESS network receives the broadcasted probe response frame 725, and accordingly, the STA 740 may not transmit separate probe request frame.

For example, the STA 700 may transmit the probe request frame 705 of which SSID is configured as LGNET, and of which BSSID is configured as the wildcard BSSID. The AP 720 that receives such a probe request frame 705 may broadcast the probe response frame 725.

In this time, another STA 740, which is going to transmit the probe request frame of which SSID is configured as LGNET, and of which MAC header address is configured as the wildcard BSSID in the same way above mentioned, may receive the probe response frame 725 that is broadcasted by the AP 720. In this case, the received probe response frame 725 may be identical to the probe response frame that is expected to receive as a response to the probe request frame. Accordingly, the other STA 745 may perform scanning for the AP 720 without transmitting a separate probe request frame.

Such a method enables an STA to receive the probe response frame without transmitting the probe request frame. As the probe request frame is not transmitted by the STA, it is available to prevent unnecessary waste of radio resource and also available to reduce signaling overhead. As many STAs transmit the probe request frame in case of performing an active scan, the probe request frame storm may act as an important factor to lower the performance of an initial link setup.

That is, in case that an AP receives the probe request frame in which a specific SSID or a SSID list is configured for the SSID and a wildcard BSSID is configured for the BSSID from a STA, the AP may broadcast the probe response frame.

In such a case, the STA that is going to transmit the probe request frame to the AP that corresponds to a specific SSID or SSID list may skip transmission of the probe request frame by receiving the probe response frame that is broadcasted. Additionally, the STA that is going to receive a beacon frame from the AP that corresponds to a specific SSID or SSID list may quickly terminate the scanning process without waiting for the beacon frame by receiving the probe response frame that is broadcasted.

The AP may perform an additional task in order to decide whether to broadcast the probe response frame.

For example, in case that the BSS load of a specific AP is great, if the probe response frame is broadcasted, the STA that is able to access another AP may access the AP that has great BSS load based on the broadcasted probe response frame. Therefore, the AP may not broadcast the probe response frame even in case that the AP receives the probe request frame in which only SSID is specified by consideration of the BSS load.

Figure 8:
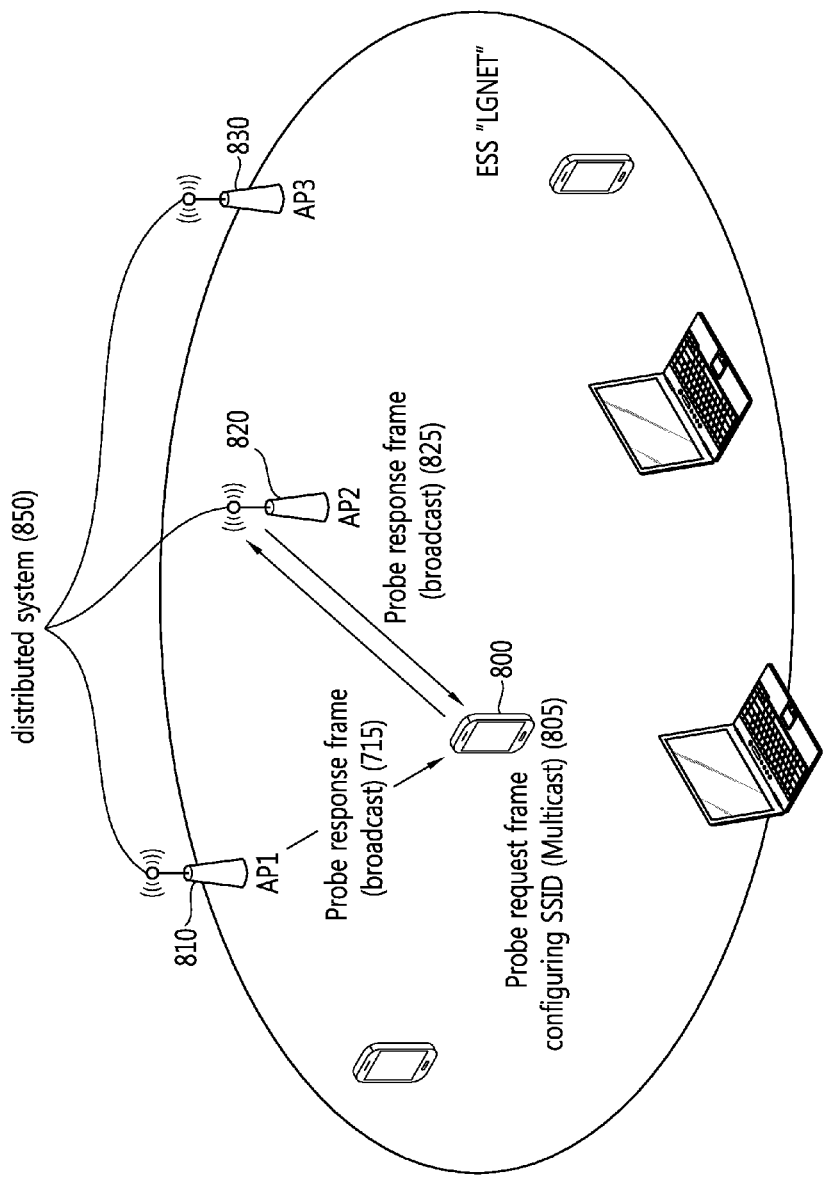
FIG. 8 is a conceptual diagram illustrating a scanning method by an STA according to an embodiment of the present invention.

FIG. 8 is a conceptual diagram illustrating a scanning method by an STA according to an embodiment of the present invention.

Referring to FIG. 8 is described a case that the ESS network is embodied in two APs (a first AP 810 and a second AP 820).

As previously described in FIG. 7, the second AP 820 may broadcast the probe response frame 825 in case of receiving a specific probe request frame 805 of which only SSID is specified. According to the embodiment of the present invention, the first AP 810 that is embodied in the ESS network may be implemented to broadcast the probe response frame 815. For example, the second AP 820 that receives the probe request frame 805 in which SSID is specified may transmit the information indicating that the first AP 810 has received the probe request frame in which SSID is specified from the STA 800 through the distributed system 850. Or, the second AP 820 that receives the probe request frame in which SSID is specified may command to broadcast the probe response frame 715 to the first AP 810 through the distributed system 850.

Through such a method, the STA that is going to access an AP of the ESS network may acquire information on the AP of ESS network without performing a separate scanning process. In addition to this, one STA 800 may receive the probe response frames 815 and 825 from a plurality of APs 810 and 820, and selectively access to the APs.

For example, the STA 800 may decide an AP that is going to perform an initial link setup by comparing the access information included in a first probe response frame 815 that is received from the first AP 810 and the access information included in a second probe response frame 825 that is received from the second AP 820. The access information, for example, may include information on BSS load, an AP channel report, and a BSS average access delay. The BSS load may include information on the current load of AP. The BSS average access delay may include information on delay that is caused from an STA accessing an AP. The AP channel report may include the channel state information between an AP and an STA.

The STA 800 may determine to which AP the STA may access among the APs that implement the ESS network by considering such access information as above.

In addition, according to the embodiments of the present invention, an STA may configure the SSID and/or the BSSID of the probe request frame by changing it to a different value based on the SSID and/or the BSSID of the MLME.SCAN-request primitive.

FIG. 9 is a conceptual diagram illustrating a method for generating the probe request frame of an STA according to an embodiment of the present invention.

In FIG. 9, a method is shown for generating the probe request frame based on the SSID and/or the BSSID transmitted through the MLME.SCAN-request primitive 900.

Referring to the upper part of FIG. 9, only the BSSID may be included in the MLME.SCAN-request primitive 900. In this case, when transmitting the probe request frame, an STA may generate the probe request frame 910 in which a specific BSSID is configured as a MAC address. The STA may transmit the probe request frame to an AP specified by the BSSID.

In addition, the BSSID and the SSID may be included in the MLME.SCAN-request primitive 950. In this case, when generating the probe request frame, the STA may determine the SSID based on the MLME.SCAN-request primitive, but configure the BSSID to be a wildcard BSSID. That is, in case that the STA acquires information about a specific SSID based on the MLME.SCAN-request primitive, the probe request frame 960 may be multicasted by specifying only the SSID even the MLME.SCAN-request primitive specifies the BSSID.

The AP that receives the probe request frame in which only the SSID is specified may broadcast the probe response frame as described above. The STA that is to scan the AP corresponding to the SSID may receive the probe response frame which is broadcasted, and may not transmit the probe request frame or may not monitor the beacon frame separately.

Even in case that the STA receives the BSSID through the MLME.SCAN-request primitive, various determining methods may be used to decide whether to multicast the probe request frame by specifying only the SSID when transmitting the probe request frame. For example, in case that the existence of STA is detected nearby based on whether there is an STA around, even though receiving the BSSID through the MLME.SCAN-request primitive, the probe request frame may be multicasted by specifying only the SSID when transmitting the probe request frame.

Figure 10:
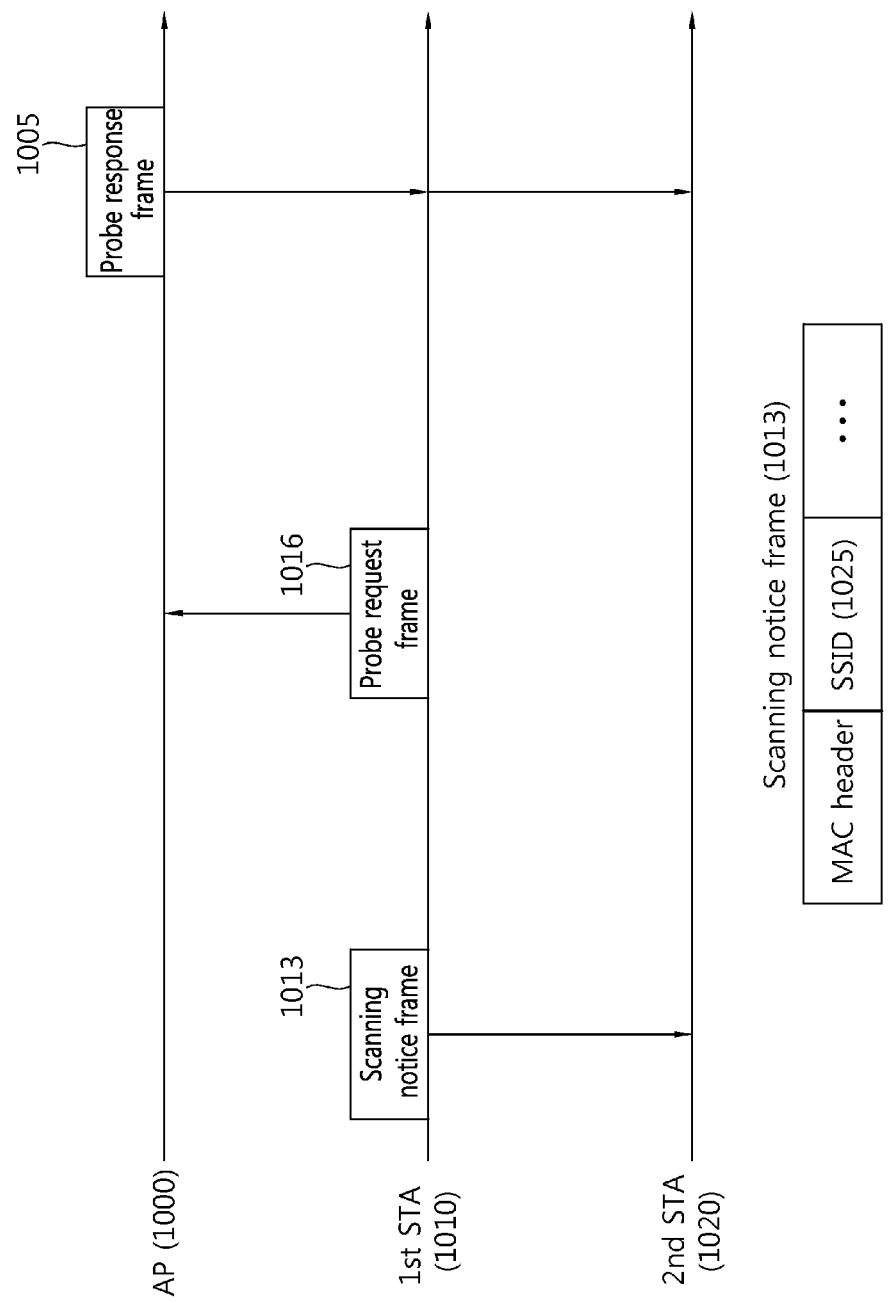
FIG. 10 is a conceptual diagram illustrating a scanning method by an STA according to an embodiment of the present invention.

FIG. 10 is a conceptual diagram illustrating a scanning method by an STA according to an embodiment of the present invention.

Referring to the upper part of FIG. 10, a first STA 1010 may broadcast a scanning notice frame 1013 before a probe request frame 1016 that indicates a specific SSID.

The first STA 1010 transmits the scanning notice frame 1013 before transmitting the probe request frame 1016 that indicates the specific SSID, and accordingly, the transmission of probe request frame performed by a second STA 1020 may be waited. Another STA 1020 that receives the scanning notice frame 1013 which is to be broadcasted may not separately transmit the probe request frame since the STA 1020 may receive a probe response frame 1005 which is broadcasted by a neighboring AP 1000 in response to the probe request frame that the first STA 1010 transmits later.

Referring to the lower part of FIG. 10, the scanning notice frame 1013 that the STA broadcasts may include SSID information 1025. Another STA that receives the scanning notice frame 1013 may determine whether the SSID 1025 specified through the scanning notice frame 1013 is identical to the SSID of a target AP. By using such a method, among the STAs that are operated in the ESS network, an STA that is to access an AP corresponding to the SSID may be prevented from unnecessarily transmitting the probe request frame.

Figure 11:
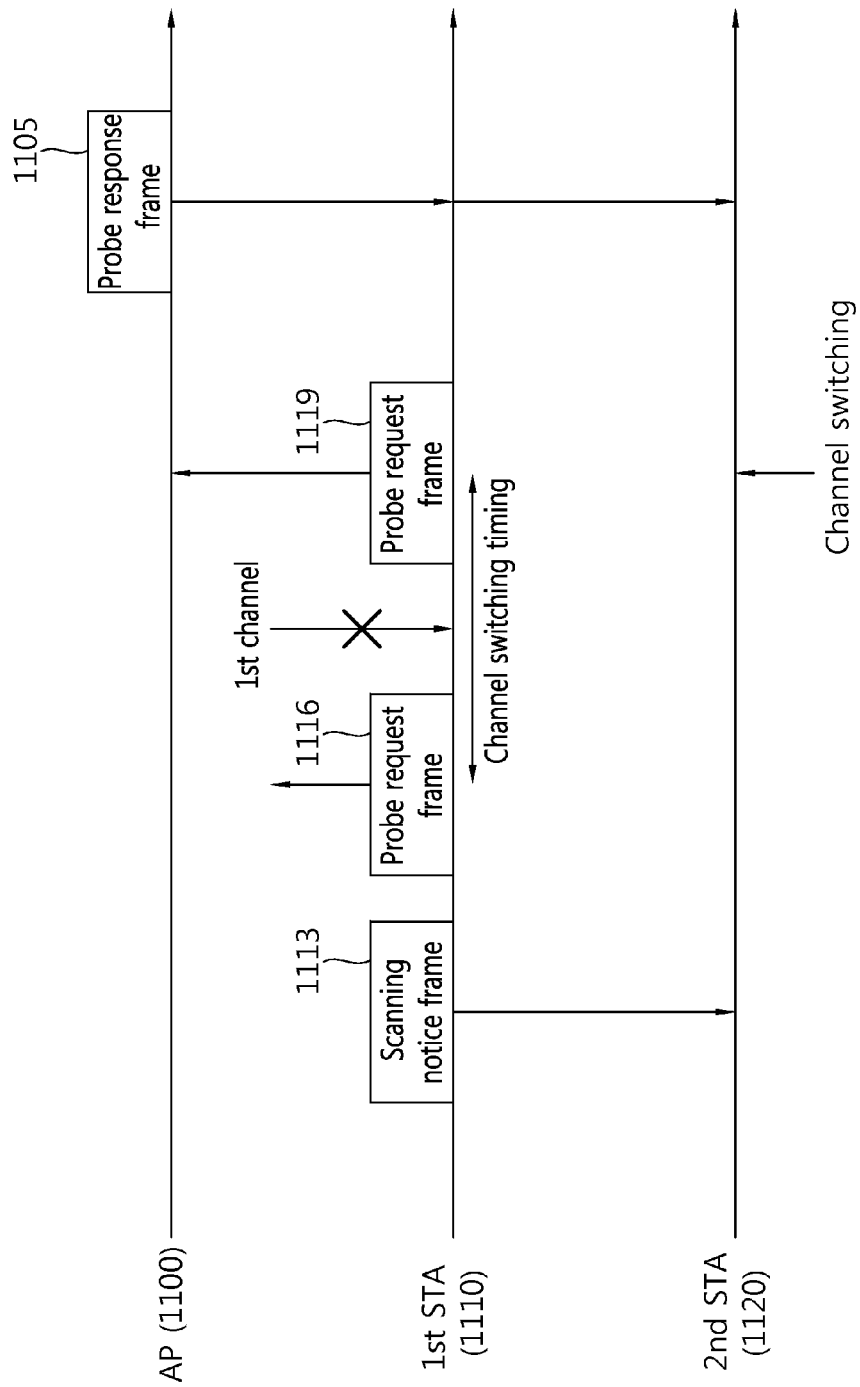
FIG. 11 is a conceptual diagram illustrating a scanning method by an STA according to an embodiment of the present invention.

FIG. 11 is a conceptual diagram illustrating a scanning method by an STA according to an embodiment of the present invention.

Referring to the upper part of FIG. 11, an STA 1110 may broadcast a scanning notice frame 1113 that includes SSID information, notice scanning channel information and channel switching timing information before transmitting a probe request frame.

As described above by referring to FIG. 10, the first STA 1110 transmits the scanning notice frame 1113 before transmitting the probe request frame 1116 that indicates the specific SSID, and accordingly, the transmission of probe request frame performed by a second STA 1120 may be waited.

In addition to this, in the scanning notice frame 1113 that the first STA 1110 transmits may be additionally included the information of a notice scanning channel that is to be scanned and channel switching timing. If the notice scanning channel is not able to receive a response to the probe request frame 1116 that the first STA 1110 transmits, the notice scanning channel may include the information of another channel to switch. If the channel switch timing is not able to receive the probe response frame in response to the probe request frame 1116 that the first STA 1110 transmits, the channel switch timing may include the information of timing of moving to other channel. The channel switch timing may include time offset information for difference between a time when the first STA 1110 transmits the scanning notice frame 1113 and a time when the first STA 1110 switches to another channel.

For example, the first STA 1110 may broadcast the scanning notice frame 1113 through a first channel. In the scanning notice frame 113 that the first STA 1110 transmits, SSID information of a target AP, notice scanning channel information and channel switching timing information may be included.

A second STA 1120 may receive the scanning notice frame 1113 which is broadcasted, and wait for transmission of the probe request frame until the channel switching timing. If it is unable to receive the probe response frame that the target AP broadcasts until the channel switching timing, the second STA 1120 may be switched to another channel based on the channel information included in the notice scanning channel information of the received scanning notice frame 1113.

If the first STA 1110 is unable to receive the probe response frame in response to the probe request frame 1116 transmitted until the channel switching timing, the first STA 1110 may perform the scanning by moving to another channel. Another channel to which the first STA 1110 is switched may be the same channel as the notice scanning channel included in the scanning notice frame.

That is, according to the embodiments of the present invention, in case that the first STA 1110 performs the scanning, the second STA 1120, which is to access an AP that implements an ESS network nearby, may perform the scanning for the target AP by being dependent upon the scanning that the first STA 1110 performs, not transmitting the probe request frame separately.

By using such a method, it may prevent the waste of radio resources, which is caused by transmitting the probe request frame by all STAs that try to access the AP of the ESS network.

FIG. 12 is a conceptual diagram illustrating a scanning notice frame according to an embodiment of the present invention.

Referring to FIG. 12, a scanning notice frame that an STA broadcasts may include SSID information, a notice scanning channel and channel switching timing.

The SSID 120 may include identifier information of a target AP to which the STA is to transmit the probe request frame.

The notice scanning channel 1220 may include information of another channel to switch if the STA that transmits the scanning notice frame is unable to receive a response to the probe request frame.

The channel switching timing 1240 may include information of the timing on moving to another channel if the STA that transmits the scanning notice frame is unable to receive the probe response frame in response to the transmitted probe request frame.

Figure 13:
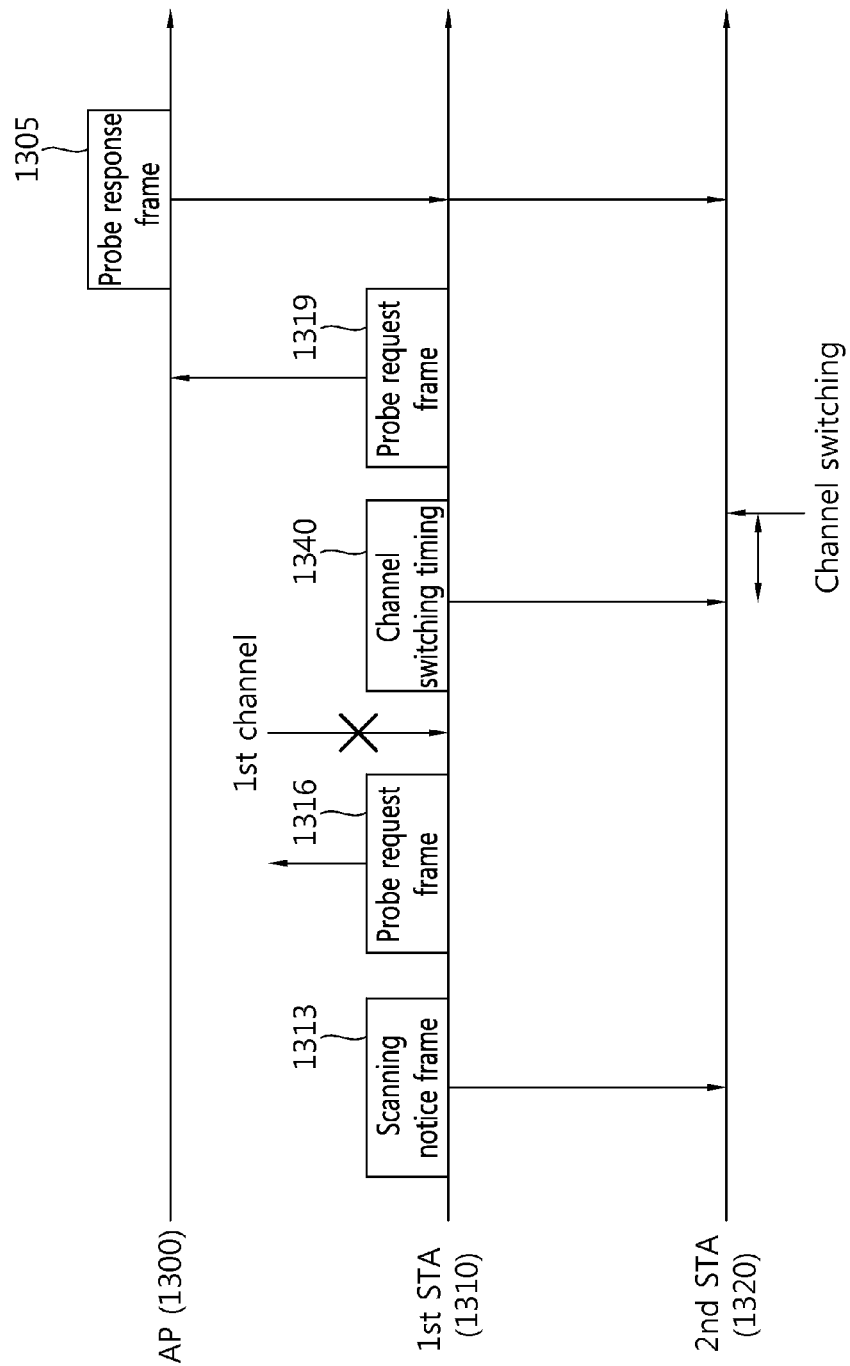
FIG. 13 is a conceptual diagram illustrating a scanning method by an STA according to an embodiment of the present invention.

FIG. 13 is a conceptual diagram illustrating a scanning method performed by an STA according to an embodiment of the present invention.

In FIG. 13, an operation of a first STA is described in case that the first STA 1310 that transmits a scanning notice frame 1313 including only SSID like the case of FIG. 10 is unable to receive a probe response frame as a response to a probe request frame 1316.

Referring to FIG. 13, the first STA 1310 may have other STAs switch a monitoring channel to another channel and receive the probe response frame 1305 by broadcasting a channel switching frame 1340, if the first STA 1310 is unable to receive the probe response frame in a first channel. In the channel switching frame 1340, information on a next channel (for example, a second channel) which the first STA 1310 moves to and performs scanning on. The first STA 1310 that transmits the channel switching frame 1340 may transmit a probe request frame 1319 to a target AP (an AP specified by the SSID) again by moving to the second channel. The scanning notice frame 1313 may include channel switching timing information, and the second STA 1320 that receives the scanning notice frame 1313 may switch to another channel based on the channel switching time information.

The second STA 1320 that receives the channel switching frame 1340 may also move to the second channel and monitor the probe response frame 1305 in response to the probe request frame 1316 that the first STA 1310 has transmitted in the second channel.

FIG. 14 is a conceptual diagram illustrating a channel switching frame according to an embodiment of the present invention.

Referring to FIG. 14, a channel switching frame may include a switching channel and switching timing.

The switching channel 1400 may include information on a channel to switch next in order for an STA to scan an AP.

The switching timing information 1450 may include information on timing when the STA moves to another channel after transmitting the channel switching frame. The information on switching time may be represented by offset information between a transmission time of the channel switching frame and the channel switching timing.

Figure 15:
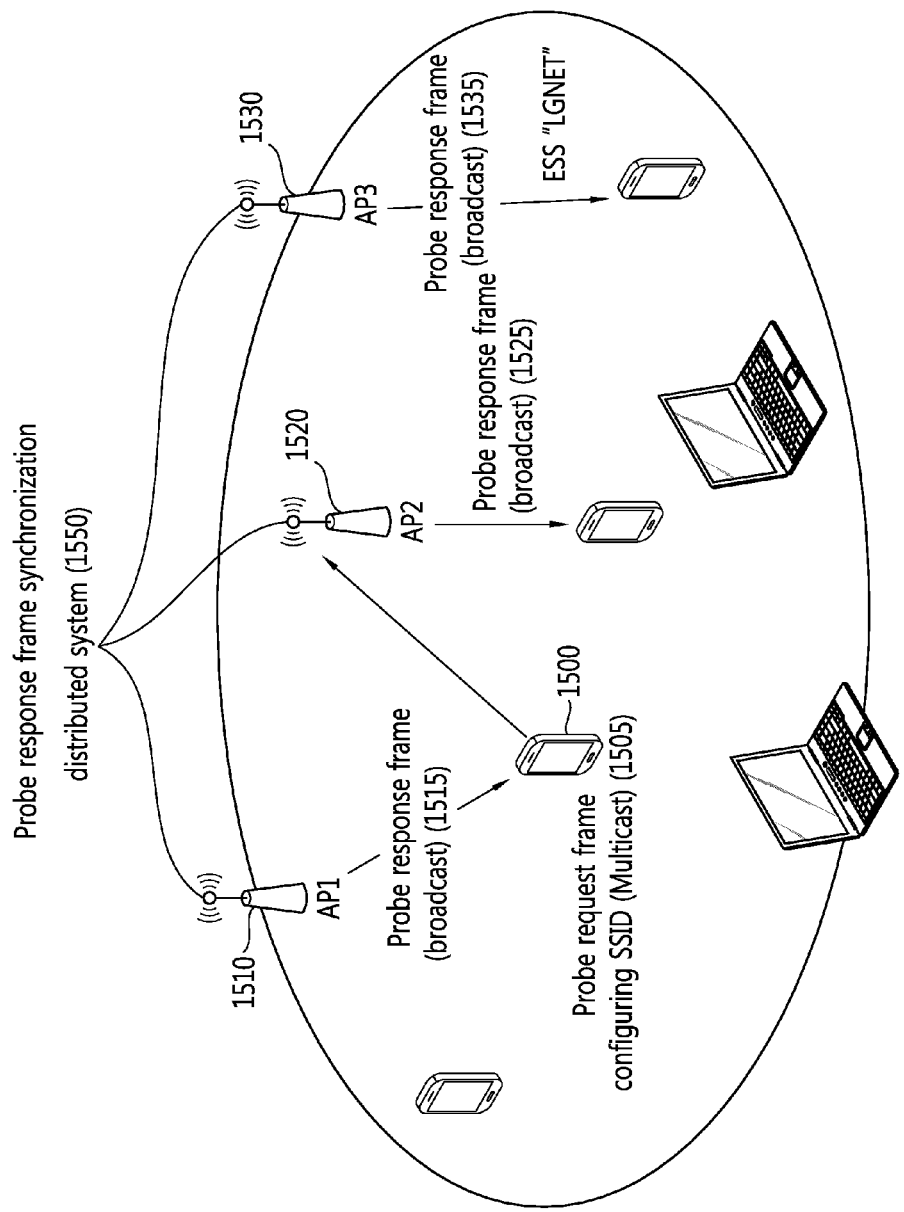
FIG. 15 is a conceptual diagram illustrating a method for transmitting a probe response frame by an AP according to an embodiment of the present invention.
Figure 16:
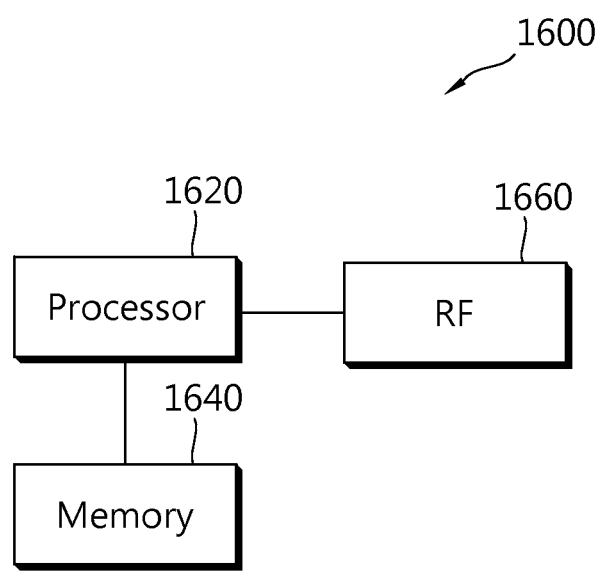
FIG. 16 is a block diagram illustrating the wireless apparatus in which an embodiment of the present invention can be implemented.

FIG. 15 is a conceptual diagram illustrating a method for transmitting a probe response frame performed by an AP according to an embodiment of the present invention.

In FIG. 15, a synchronizing method is introduced when a plurality of APs 1510, 1520 and 1530 that embody the ESS network transmit probe response frames 1515, 1525 and 1535.

For example, in case that an STA 1500 multicasts a probe request frame 1505 of which the SSID is specified, as described in referring to FIG. 8, a plurality of APs 1510, 1520 and 1530 may broadcast the probe response frames 1515, 1525 and 1535.

If a time difference occurs when the plurality of APs 1510, 1520 and 1530 transmit the probe response frames 1515, 1525 and 1535, the plurality of APs 1510, 1520 and 1530 may determine to which AP an initial link setup by considering the probe response frame transmitted within a predetermined time only. That is, an STA 1505 may not consider the probe response frames 1515, 1525 and 1535 that the plurality of APs 1510, 1520 and 1530 of the ESS network transmit. In order to prevent such a case, the APs 1510, 1520 and 1530 may synchronize the timing for transmitting the probe response frames 1515, 1525 and 1535 with the ESS network. For example, in case that communications are made among the APs 1510, 1520 and 1530 based on an interface such as a distributed system 1550, the plurality of APs 1510, 1520 and 1530 may be configured to transmit the probe response frames 1515, 1525 and 1535 on the same timing. In the same reason, transmission timing of a beacon frame that the plurality of APs 1510, 1520 and 1530 of the ESS network transmit may be synchronized.

FIG. 19 is a block diagram illustrating a wireless device to which an embodiment of the present invention may apply.

Referring to FIG. 19, the wireless device 1900 may be an STA that may implement the above-described embodiments, and the wireless device 1900 may be an AP or a non-AP STA (station).

The wireless device 1900 includes a processor 1920, a memory 1940, and an RF (Radio Frequency) unit 1960.

The RF unit 1960 may be connected with the processor 1920 to transmit/receive radio signals.

The processor 1920 implements functions, processes, and/or methods as proposed herein. For example, the processor 1920 may be implemented to perform the operation of the above-described wireless device according to an embodiment of the present invention.

For example, in case that the wireless apparatus is an AP, the processor 1620 may be implemented to broadcast the probe response frame in case of receiving the probe request frame of which the SSID is specified and multicasted.

In addition, in case that the wireless apparatus is an STA, the processor 1620 may generate the MLME.SCAN-request primitive including information on a specific BSSID and a specific SSID, and generate the probe request frame including a wildcard BSSID and the SSID based on the MLME.SCAN-request primitive. In addition, the processor 1620 may be implemented to multicast the probe request frame to a first AP that embodies the extended service set (ESS) network specified by the SSID, and to receive the probe response frame broadcasted from the first AP in response to the probe request frame.

The processor 1920 may include an ASIC (Application-Specific Integrated Circuit), other chipset, a logic circuit, a data processing device, and/or a converter that performs conversion between a baseband signal and a radio signal. The memory 1940 may include a ROM (Read-Only Memory), a RAM (Random Access Memory), a flash memory, a memory card, a storage medium, and/or other storage device. The RF unit 1960 may include one or more antennas that transmit and/or receive radio signals.

When an embodiment is implemented in software, the above-described schemes may be embodied in modules (processes, or functions, etc.) performing the above-described functions. The modules may be stored in the memory 1940 and may be executed by the processor 1920. The memory 1940 may be positioned in or outside the processor 1920 and may be connected with the processor 1920 via various well-known means.

What is claimed is:

1. A method for performing, by a first station (STA), a scanning procedure, the method comprising:
 broadcasting, by the first STA, a scanning notice frame to a second STA before a probe request frame is transmitted, wherein the probe request frame is generated based on a wildcard basic service set identifier (BSSID) and a service set identifier (SSID) which are included in a Medium Access Control (MAC) layer management entity (MLME)-SCAN.request primitive;
 multicasting, by the first STA, the probe request frame to an access point (AP) included in an extended service set (ESS) network specified by the SSID; and
 receiving, by the first STA, a probe response frame broadcasted by the AP in response to the probe request frame, wherein the second STA receives the probe response frame without transmitting the probe request frame to the AP according to the scanning notice frame.

2. The method of claim 1,
 wherein the second STA scans the AP specified by the SSID based on the probe response frame.

3. The method of claim 1,
 wherein the wildcard BSSID is included in an address field of MAC header of the probe request frame, and
 wherein the SSID is included in a payload of the probe request frame.

4. The method of claim 1,
 wherein the second STA determines not to transmit the probe request frame when a SSID included in the scanning notice frame is identical to a SSID of the AP.

5. The method of claim 1,
 wherein the scanning notice frame includes information on a notice scanning channel and information on a channel switching timing,
 wherein the information the notice scanning channel includes information on a second channel to be switched when the first STA does not receive a response to the probe request frame through a first channel, and
 wherein the information on the channel switching timing includes information on timing of moving to the second channel when the first STA does not receive the response to the probe request frame through the first channel.

6. A first station (STA) operated in a wireless LAN, the first STA comprising:
 a radio frequency (RF) unit configured to receive a radio signal; and
 a processor operatively connected to the RF unit and configured to:
 broadcast a scanning notice frame to a second STA before a probe request frame is transmitted, wherein the probe request frame is generated based on a wildcard basic service set identifier (BSSID) and a service set identifier (SSID) which are included in a Medium Access Control (MAC) layer management entity (MLME)-SCAN.request primitive;
 multicast the probe request frame to an access point (AP) included in an extended service set (ESS) network specified by the SSID; and
 receive a probe response frame broadcasted by the AP in response to the probe request frame, wherein the second STA receives the probe response frame without transmitting the probe request frame to the AP according to the scanning notice frame.

7. The first STA of claim 6,
 wherein the second STA scans the AP specified by the SSID based on the probe response frame.

8. The first STA of claim 6,
 wherein the wildcard BSSID is included in an address field of MAC header of the probe request frame, and
 wherein the SSID is included in a payload of the probe request frame.

9. The first STA of claim 6,
 wherein the second STA determines not to transmit the probe request frame when a SSID included in the scanning notice frame is identical to a SSID of the AP.

10. The first STA of claim 6,
wherein the scanning notice frame includes information on a notice scanning channel and information on a channel switching timing,
wherein the information the notice scanning channel includes information on a second channel to be switched when the first STA does not receive a response to the probe request frame through a first channel, and
wherein the information on the channel switching timing includes information on timing of moving to the second channel when the first STA does not receive the response to the probe request frame through the first channel.

* * * * *